(12) United States Patent
Brehmer (10) Patent No.: US 9,846,529 B2
(45) Date of Patent: Dec. 19, 2017

(54) METHOD FOR PROCESSING INFORMATION AND ELECTRONIC DEVICE

(71) Applicant: Lenovo (Beijing) Co., Ltd., Beijing (CN)

(72) Inventor: Jesper Brehmer, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 513 days.

(21) Appl. No.: 14/470,144

(22) Filed: Aug. 27, 2014

(65) Prior Publication Data

US 2015/0242094 A1 Aug. 27, 2015

(30) Foreign Application Priority Data

Feb. 24, 2014 (CN) .......................... 2014 1 0062773

(51) Int. Cl.
| | | |
|---|---|---|
| G06F 3/048 | (2013.01) | |
| G06F 3/0484 | (2013.01) | |
| G06F 3/01 | (2006.01) | |
| G06F 3/0481 | (2013.01) | |
| G06F 3/0482 | (2013.01) | |
| G06F 3/0488 | (2013.01) | |
| G06F 1/16 | (2006.01) | |

(Continued)

(52) U.S. Cl.
CPC .......... *G06F 3/04842* (2013.01); *G06F 1/163* (2013.01); *G06F 3/014* (2013.01); *G06F 3/017* (2013.01); *G06F 3/0304* (2013.01); *G06F 3/0425* (2013.01); *G06F 3/0481* (2013.01); *G06F 3/0482* (2013.01); *G06F 3/0488* (2013.01); *G06F 3/04817* (2013.01); *G06F 3/04847* (2013.01)

(58) Field of Classification Search
CPC .... G06F 1/1639; G06F 1/1645; G06F 3/0425; G06F 3/0426
USPC .......................... 715/764, 781, 788, 801, 804
See application file for complete search history.

(56) References Cited

U.S. PATENT DOCUMENTS 9,134,799 B2 9/2015 Mark
2008/0018591 A1* 1/2008 Pittel ..................... G06F 1/1616
345/156

(Continued)

FOREIGN PATENT DOCUMENTS

| CN | 102164204 A | 8/2011 |
|---|---|---|
| CN | 102985896 A | 3/2013 |

OTHER PUBLICATIONS

First German Office Action regarding Application No. 102014113229.7 dated Oct. 6, 2016. English translation provided by the German Patent & Trademark Office.

(Continued)

*Primary Examiner* — Phuong Nguyen
(74) *Attorney, Agent, or Firm* — Harness, Dickey & Pierce, P.L.C.

(57) ABSTRACT

A method for processing information is provided in which triggering information is acquired through one of a plurality of sensors in an electronic device. In response to the triggering information, a graphical interaction interface is projected onto a first portion of a user through a projection lens. Through another of the plurality of sensors, an interaction operation performed on the graphical interaction interface is acquired; and the graphical interaction interface is changed in response to the interaction operation.

6 Claims, 9 Drawing Sheets

(51) Int. Cl.
   *G06F 3/03*   (2006.01)
   *G06F 3/042*   (2006.01)

(56) References Cited

U.S. PATENT DOCUMENTS

2010/0199232 A1* 8/2010 Mistry .................... G06F 1/163
                                                                    715/863
2011/0267316 A1* 11/2011 Kim ...................... G06F 1/1639
                                                                    345/175
2012/0017147 A1   1/2012 Mark

OTHER PUBLICATIONS

Harrison, Chris et al.: "Skinput: Appropriating the Body as an Input Surface," CHI 2010: Computing on the Body, Apr. 2010, pp. 453-462.
Harrison, Chris et al.: "OmniTouch: Wearable Multitouch Interaction Everywhere," UIST '11 Proceedings of the 24th Annual ACM Symposium on User Interface Software & Technology. Oct. 2011, pp. 441-450.
First Chinese Office Action regarding Application No. 201410062773.2 dated Jun. 6, 2017. English translation provided by Unitalen Attorneys at Law.

* cited by examiner

METHOD FOR PROCESSING INFORMATION AND ELECTRONIC DEVICE

CROSS REFERENCES OF RELATED APPLICATION

The present application claims the priority to Chinese Patent Application No. 201410062773.2, entitled "METHOD FOR PROCESSING INFORMATION AND ELECTRONIC DEVICE", filed on Feb. 24, 2014 with the State Intellectual Property Office of People's Republic of China, which is incorporated herein by reference in its entirety.

FIELD

The disclosure relates to the field of data processing, and in particular, to a method for processing information and an electronic device.

BACKGROUND

With the development in electronic devices, consumers require high demands for displays of the electronic devices. User experiences may be improved in the case that the users interact with the electronic devices through larger human-computer interaction interfaces.

A size of the electronic device is restricted by different application scenarios. Taking a smart watch as an example, conventionally, the user needs to wear the smart watch around his wrist to perform information interaction with the smart watch. Hence, the size of the smart watch is restricted, the area of the display of the smart watch is restricted, and accordingly, the area of the human-computer interaction interface is restricted, thereby causing a poor user experience.

Since the human-computer interaction interface is displayed on the display, the area of the human-computer interaction interface is restricted in case of a size-determined display. That is, the size of the human-computer interaction interface is affected by the size of the display of the electronic device, thereby resulting in a poor user experience.

SUMMARY

In view of this, a method for processing information and an electronic device are provided in the disclosure to solve conventional problems that an area of a display of the smart watch and an area of a human-computer interaction interface are restricted since a size of a smart watch is restricted, and accordingly a poor user experience is caused.

A method for processing information is provided. The method is applied to an electronic device. The electronic device includes a housing which can be for example a frame structure, a first display component, a second display component and M sensors. The frame structural body includes a fixing structure through which the electronic device is fixable to a first operation body of a first user. The first display component and the second display component are fixed on the frame structure. The first display component includes a display exposed on a first surface of the frame structure, the second display component includes a projection lens exposed on a second surface of the frame structure, and the first surface intersects with the second surface. The M sensors are fixed through the frame structure. The M sensors include a first sensor exposed from the second surface of the frame structure.

The method includes:
acquiring triggering information through a second sensor among the M sensors;
projecting, in response to the triggering information, a graphical interaction interface onto a first portion of the first operation body through the projection lens, where the first portion of the first operation body is located on a same side as the second surface;
acquiring, through the first sensor, an interaction operation performed by a second operation body on the graphical interaction interface; and
changing the graphical interaction interface in response to the interaction operation.

An electronic device is provided. The electronic device includes a frame structure, a first display component, a second display component and M sensors. The frame structure includes a fixing structure through which the electronic device is fixable to a first operation body of a first user. The first display component and the second display component are fixed on the frame structure. The first display component includes a display exposed on a first surface of the frame structure, the second display component includes a projection lens exposed on a second surface of the frame structure, and the first surface intersects with the second surface. The M sensors are fixed through the frame structure body. The M sensors include a first sensor exposed from the second surface of the frame structure.

The electronic device further includes:
a first acquisition unit, for acquiring triggering information through a second sensor among the M sensors;
a first response unit, for projecting, in response to the triggering information acquired by the first acquisition unit, a graphical interaction interface onto a first portion of the first operation body through the projection lens, where the first portion of the first operation body is located on a same side as the second surface;
a second acquisition unit, for acquiring, through the first sensor, an interaction operation performed by a second operation body on the graphical interaction interface; and
a second response unit, for changing the graphical interaction interface in response to the interaction operation.

In the method for processing information and the electronic device provided in the disclosure, the triggering information may be acquired through the second sensor arranged on the electronic device, the graphical interaction interface may be projected onto the first operation body (the arm of the user) through the projection lens, then the interaction operation performed on the graphical interaction interface by the second operation body (the hand of the user) may be acquired through the first sensor, and the graphical interaction interface may be changed. With the method for processing information and the electronic device according to the embodiments of the disclosure, the graphical interaction interface may be projected onto the arm of the user, and the graphical interaction interface projected onto the arm of the user may be changed in response to the interaction operation performed on the graphical interaction interface. The size of the graphical interaction interface is not limited by sizes of the electronic device and the display, thereby leading to a good user experience.

BRIEF DESCRIPTION OF THE DRAWINGS

Drawings to be used in descriptions of embodiments of the disclosure are described briefly hereinafter to clarify a technical solution according to the embodiments of the disclosure or the conventional technologies. Obviously, other drawings may be obtained by those skilled in the art based on the drawings provided herein without any creative works.

DETAILED DESCRIPTION OF THE EMBODIMENTS

It is obvious that the described embodiments are only a part of rather than all of the embodiments of the present disclosure. Any other embodiments obtained by those skilled in the art based on the embodiments of the present disclosure without any creative works should fall in the scope of the present disclosure.

Figure 1:
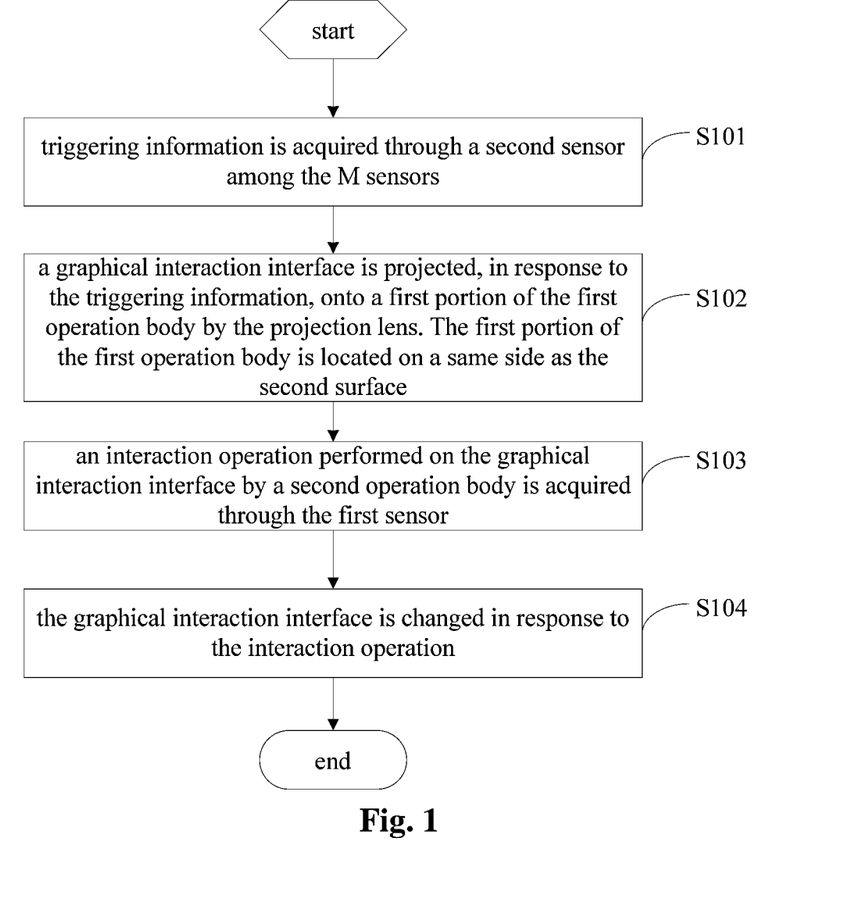
FIG. 1 is a schematic flow chart of a method for processing information according to an embodiment of the disclosure.
Figure 2A:
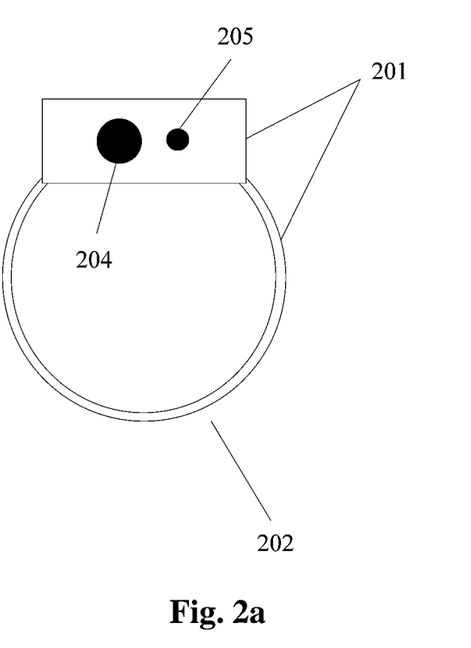
FIGS. 2a and 2b are schematic structural diagrams of an electronic device according to an embodiment of the disclosure.
Figure 2B:
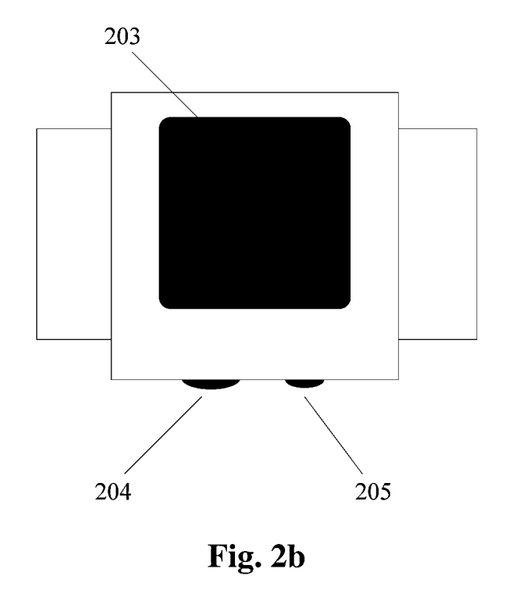

FIG. 1 is a schematic flow chart of a method for processing information according to an embodiment of the disclosure. The method is applied to an electronic device. A structure of the electronic device is shown in FIG. 2. The electronic device includes a frame structure 201, a first display component, a second display component and M sensors. The frame structure 201 includes a fixing structure 202 through which the electronic device is fixable to a first operation body of a first user. The first display component and the second display component are fixed on the frame structure 201, the first display component includes a display 203 exposed on a first surface of the frame structure 201, the second display component includes a projection lens 204 exposed on a second surface of the frame structure 201, and the first surface intersects with the second surface. The M sensors are fixed through the frame structure 201. The M sensors include a first sensor 205 and the first sensor is exposed from the second surface of the frame structure 201. The method may include the following steps S101-S104.

In the step S101, triggering information is acquired through a second sensor among the M sensors.

There are various implementations for the electronic device to acquire the triggering information through the second sensor.

In one implementation, the second sensor may be a touch screen. A touch button is displayed on the touch screen, and the electronic device acquires the triggering information in the case that the touch screen detects that the touch button is touched.

In one implementation, the second sensor may be a physical button arranged on the frame structure, and the electronic device acquires the triggering information in the case that the physical button is pressed.

In one implementation, the second sensor may be a camera. The camera may capture a gesture of a user, and the electronic device acquires the triggering information in the case that the gesture captured by the camera matches a preset gesture.

In one implementation, the second sensor may be a touch unit arranged on the display. In the case that an operable object is displayed on the display and the touch unit detects a touch operation performed on the operable object, the electronic device acquires the triggering information. For example, prompting information (such as, a short message is received) is displayed on the display, and the electronic device may acquire the triggering information in the case that the prompting information is clicked by the user.

In the step S102, a graphical interaction interface is projected, in response to the triggering information, onto a first portion of the first operation body by the projection lens. The first portion of the first operation body is located on a same side as the second surface.

The first operation body is an arm of the user. The electronic device projects the graphical interaction interface onto the arm of the user through the projection lens.

In the step S103, an interaction operation performed on the graphical interaction interface by a second operation body is acquired through the first sensor.

The first sensor may be a camera, the second operation body may be a hand of the user, and the interaction operation may be a touch gesture. The electronic device may capture, through the camera, the touch gesture performed on the graphical interaction interface by the user.

In the step S104, the graphical interaction interface is changed in response to the interaction operation.

The graphical interaction interface may be changed with different manners. For example, a size of the graphical interaction interface or contents displayed in the graphical interaction interface may be changed.

In the method for processing information provided in the disclosure, the triggering information may be acquired through the second sensor arranged on the electronic device, the graphical interaction interface may be projected onto the first operation body (the arm of the user) through the projection lens, then the interaction operation performed on the graphical interaction interface by the second operation body (the hand of the user) may be acquired through the first sensor, and the graphical interaction interface may be changed. With the method for processing information according to the embodiment of the disclosure, the graphical interaction interface may be projected onto the arm of the user, and the graphical interaction interface projected onto the arm of the user may be changed in response to the interaction operation performed on the graphical interaction interface. The size of the graphical interaction interface is not limited by sizes of the electronic device and the display, thereby leading to a good user experience.

Figure 3:
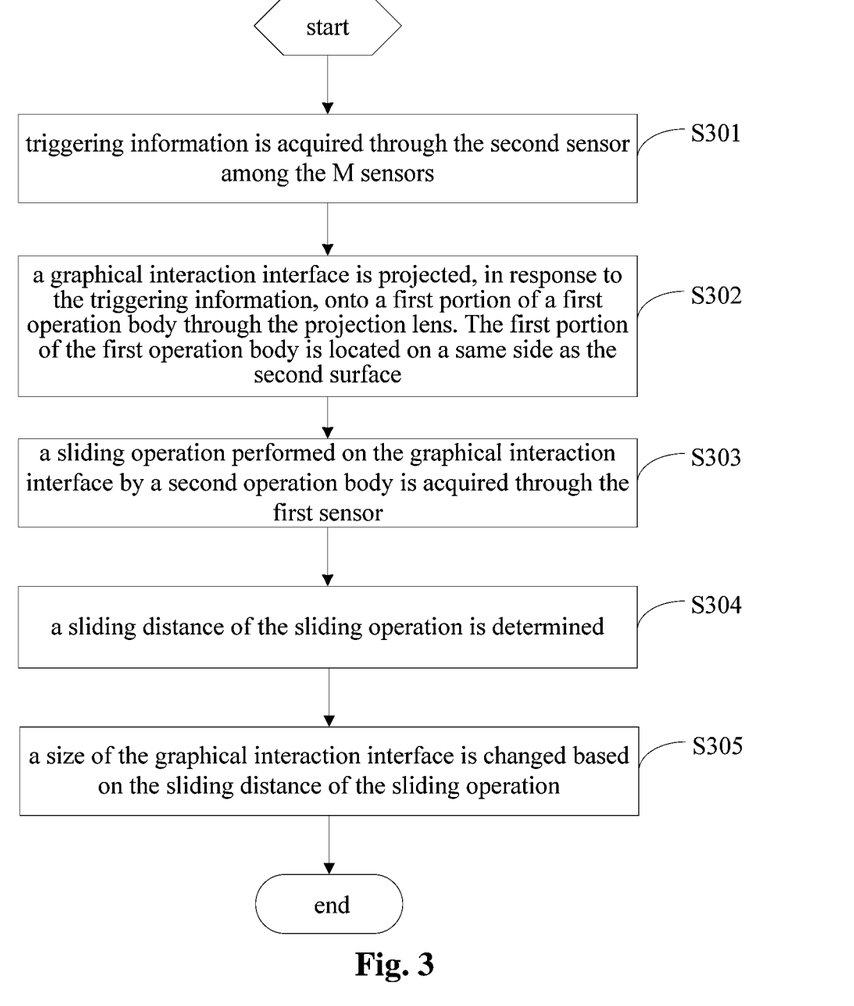
FIG. 3 is a schematic flow chart of a method for processing information according to an embodiment of the disclosure.

FIG. 3 is a schematic flow chart of a method for processing information according to an embodiment of the disclosure. The method is also applied to the electronic device shown in FIG. 2. The method may include the following step S301-S305.

In the step S301, triggering information is acquired through the second sensor among the M sensors.

Implementations for the electronic device to acquire the triggering information through the second sensor may be referred to the foregoing embodiment, which is not repeated herein.

In the step S302, a graphical interaction interface is projected, in response to the triggering information, onto a first portion of a first operation body through the projection lens. The first portion of the first operation body is located on a same side as the second surface.

The graphical interaction interface displayed on the first operation body, i.e., on the arm of the user may be a small interface, a part of the interface, or an interface displaying prompting information.

In the step S303, a sliding operation performed on the graphical interaction interface by a second operation body is acquired through the first sensor.

The sliding operation performed on the graphical interaction interface by the second operation body may be a sliding operation away from the second surface.

In the step S304, a sliding distance of the sliding operation is determined.

The M sensors may include a third sensor, which is for detecting the sliding distance of the sliding operation. The third sensor may be exposed from the second surface of the frame structure. The third sensor may be, but not limited to a distance sensor. The distance sensor may detect the sliding distance of the sliding operation away from the second surface performed by the second operation body.

In the step S305, a size of the graphical interaction interface is changed based on the sliding distance of the sliding operation.

The electronic device may change the size of the graphical interaction interface based on the sliding distance detected by the third sensor. For example, the longer the sliding distance is, the larger the graphical interaction interface displayed on the first operation body is.

Figure 4A:
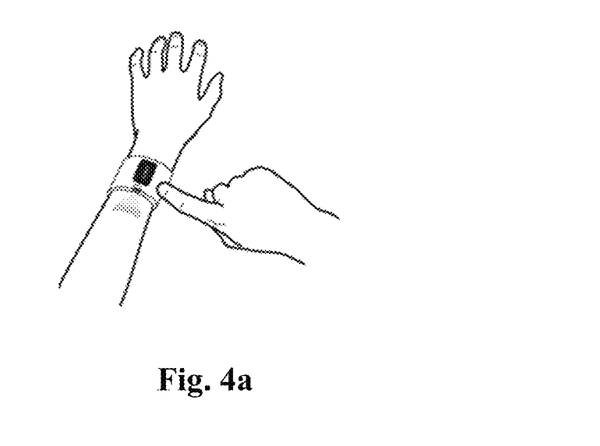
FIGS. 4a, 4b, 4c illustrate an implementation process of changing a size of a graphical interaction interface.
Figure 4B:
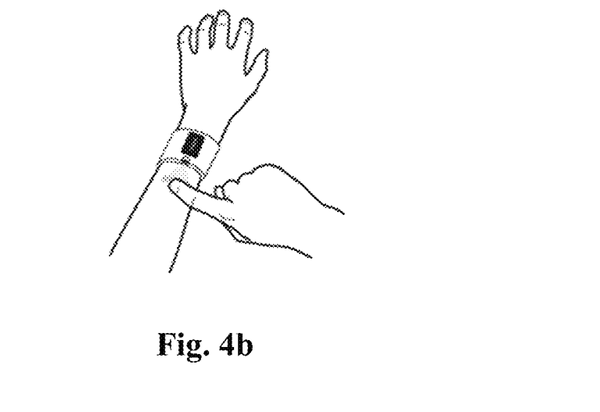
Figure 4C:
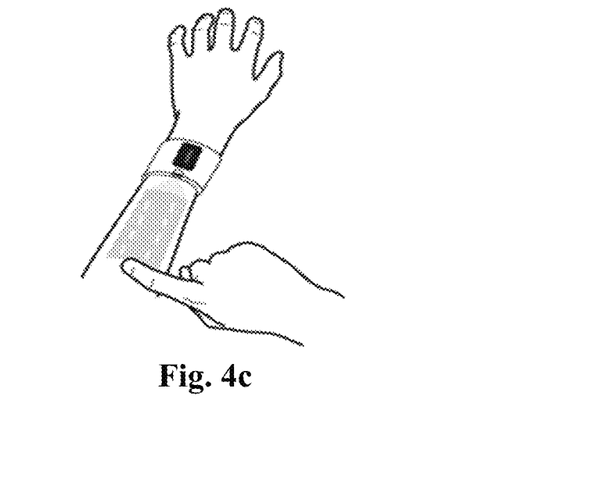

An example of changing the size of the graphical interaction interface is as shown in FIG. 4. A touch unit is provided at a side of the display of the electronic device. The touch unit is for detecting a touch operation performed by a finger of the user. The electronic device acquires the triggering information in the case that the user clicks the touch unit with his finger (as shown in FIG. 4a). The graphical interaction interface is projected onto the arm of user through the projection lens, and the graphical interaction interface projected onto the arm of the user is a small interface (as shown in FIG. 4b). The electronic device enlarges the small interface based on the sliding distance in the case that the finger of the user performs, on the small interface. the sliding operation away from the second surface (as shown in FIG. 4c).

In the method for processing information provided in the disclosure, the graphical interaction interface is projected onto the arm of the user, and the user may change the size of the graphical interaction interface projected onto the arm of the user with the sliding operation performed on the graphical interaction interface. The size of the graphical interaction interface is not limited by sizes of the electronic device and the display, thereby leading to a good user experience.

Figure 5:
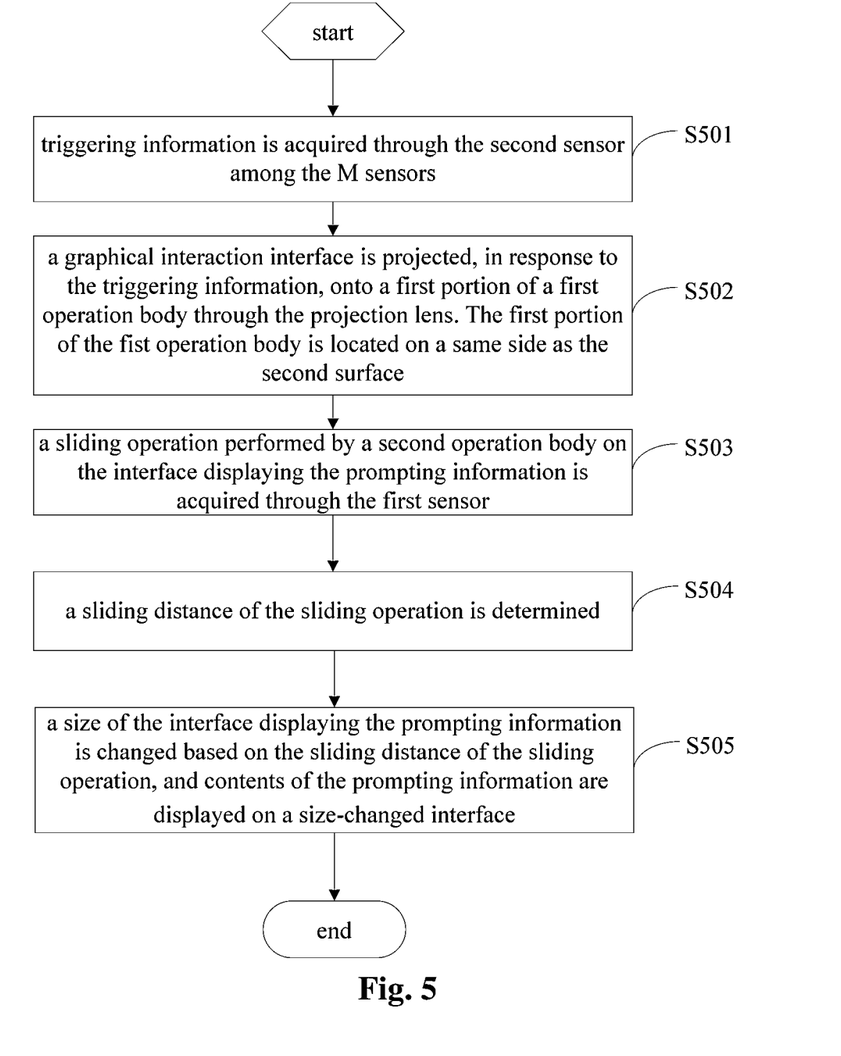
FIG. 5 is a schematic flow chart of a method for processing information according to an embodiment of the disclosure.

FIG. 5 is a schematic flow chart of a method for processing information according to an embodiment of the disclosure. The method is also applied to the electronic device shown in FIG. 2. The method may include the following steps S501-S505.

In the step S501, triggering information is acquired through the second sensor among the M sensors.

In the step S502, a graphical interaction interface is projected, in response to the triggering information, onto a first portion of a first operation body through the projection lens. The first portion of the first operation body is located on a same side as the second surface.

For example, the second sensor is a touch unit. The second sensor is arranged on the display exposed on the first surface of the frame structure. Prompting information is displayed on the display exposed on the first surface of the frame structure in the case that the electronic device receives information such as a short message. The electronic device acquires the triggering information in the case that a user clicks the touch unit to perform an operation on the prompting information displayed on the display. Then an interface displaying the prompting information is projected, in response to the triggering information, onto the first operation body.

In the step S503, a sliding operation performed by a second operation body on the interface displaying the prompting information is acquired through the first sensor.

The second operation body may be a hand of the user. For example, the first operation body is the left arm of the user, and the second operation body is right hand of the user. The electronic device projects the graphical interaction interface onto the left arm of the user through the projection lens, and the user performs, through the right hand of the user, an interaction operation on the graphical interaction interface displayed on the left arm of the user.

In the step S504, a sliding distance of the sliding operation is determined.

In the step S505, a size of the interface displaying the prompting information is changed based on the sliding distance of the sliding operation, and contents of the prompting information are displayed on a size-changed interface.

An example of changing the size of the interface displaying the prompting information may be referred to FIG. 4. A touch unit is provided at a side of the display of the electronic device. The touch unit is for detecting a touch operation performed by a finger of the user. The electronic device acquires the triggering information in the case that the user clicks on the touch unit with his finger (as shown in FIG. 4a). The graphical interaction interface is projected onto the arm of user through the projection lens, and the graphical interaction interface projected onto the arm of the user is a small interface (as shown in FIG. 4b). The electronic device enlarges the small interface based on the sliding distance in the case that the finger of the user performs, on the small interface, a sliding operation away from the second surface, and the contents of the prompting information are displayed on the enlarged interface (as shown in FIG. 4c). Assuming that the prompting information prompts that a short message is received, in the case that the electronic device obtains the sliding operation performed on the interface of the prompting information, the electronic device enlarges, based on the sliding distance of the sliding operation, the interface displaying the prompting information, and contents displayed in the enlarged interface are switched from the prompting information into contents of the short message.

With the method for processing information provided in the disclosure, the graphical interaction interface is projected onto the arm of the user, the user may change the size of the graphical interaction interface projected onto the arm of the user through the sliding operation performed on the graphical interaction interface, and the contents displayed in the graphical interaction interface may be changed. The size of the graphical interaction interface is not limited by sizes of the electronic device and the display, thereby leading to a good user experience.

Figure 6:
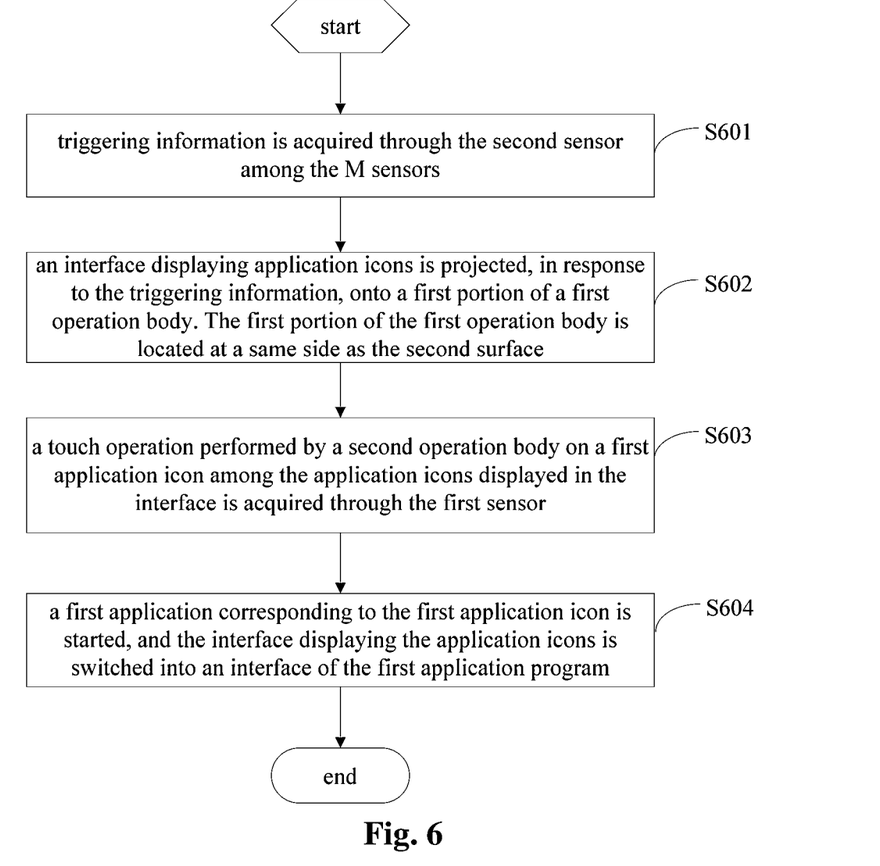
FIG. 6 is a schematic flow chart of a method for processing information according to an embodiment of the disclosure.

FIG. 6 is a schematic flow chart of a method for processing information according to an embodiment of the disclosure. The method is also applied to the electronic device shown in FIG. 2. The method may include the following steps S601-S604.

In the step S601, triggering information is acquired through the second sensor among the M sensors.

In the step S602, an interface displaying application icons is projected, in response to the triggering information, onto a first portion of a first operation body. The first portion of the first operation body is located at a same side as the second surface.

According to the embodiment, the electronic device has a standard mode and a smart mode.

In the standard mode, the electronic device may only display information such as time on the display exposed on the first surface of the frame structure. It may be understood that the power is saved since the electronic device in the standard mode is only for displaying the information such as the time.

The electronic device switches from the standard mode to the smart mode in case of acquiring the triggering information. In the smart mode, the electronic device projects the interface displaying the application icons onto the first portion of the first operation body, and the electronic device may respond to an operation performed by a user on an application icon displayed in the interface displaying the application icons.

It should be noted that, in the smart mode, the display exposed on the first surface of the frame structure may display information or may not display information.

In the step S603, a touch operation performed by a second operation body on a first application icon among the application icons displayed in the interface is acquired through the first sensor.

In the step S604, a first application corresponding to the first application icon is started, and the interface displaying the application icons is switched into an interface of the first application program.

Figure 7:
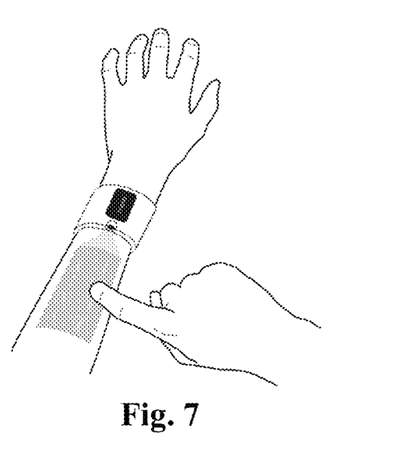
FIG. 7 is a schematic diagram of performing an operation on an application icon among multiple application icons displayed in an interface.

For example, as shown in FIG. 7, the electronic device under the standard mode switches from the standard mode to the smart mode in case of obtaining the triggering information. The interface displaying the application icons is projected onto an arm of the user through the projection lens. The user may perform an operation on an application icon among the application icons displayed in the interface. The user may click with his finger on an application icon among the application icons displayed in the interface to start the first application corresponding to the clicked application icon, and the electronic device switches from a current interface into an interface of the first application. For example, in the case that the user clicks on an icon of playing music, the electronic device starts a music playing application to play a song, and switches from the interface displaying the application icons into an interface of the music playing application.

With the method for processing information provided in the disclosure, the interface displaying the application icons may be projected onto an arm of the user. The user starts the first application through the touch operation performed on the first application icon among the application icons displayed in the interface, and the electronic device switches from the interface displaying the application icons into the interface of the first application. A size of a graphical interaction interface projected onto the arm of the user is not limited by sizes of the electronic device and the display, thereby leading to a good user experience.

Figure 8:
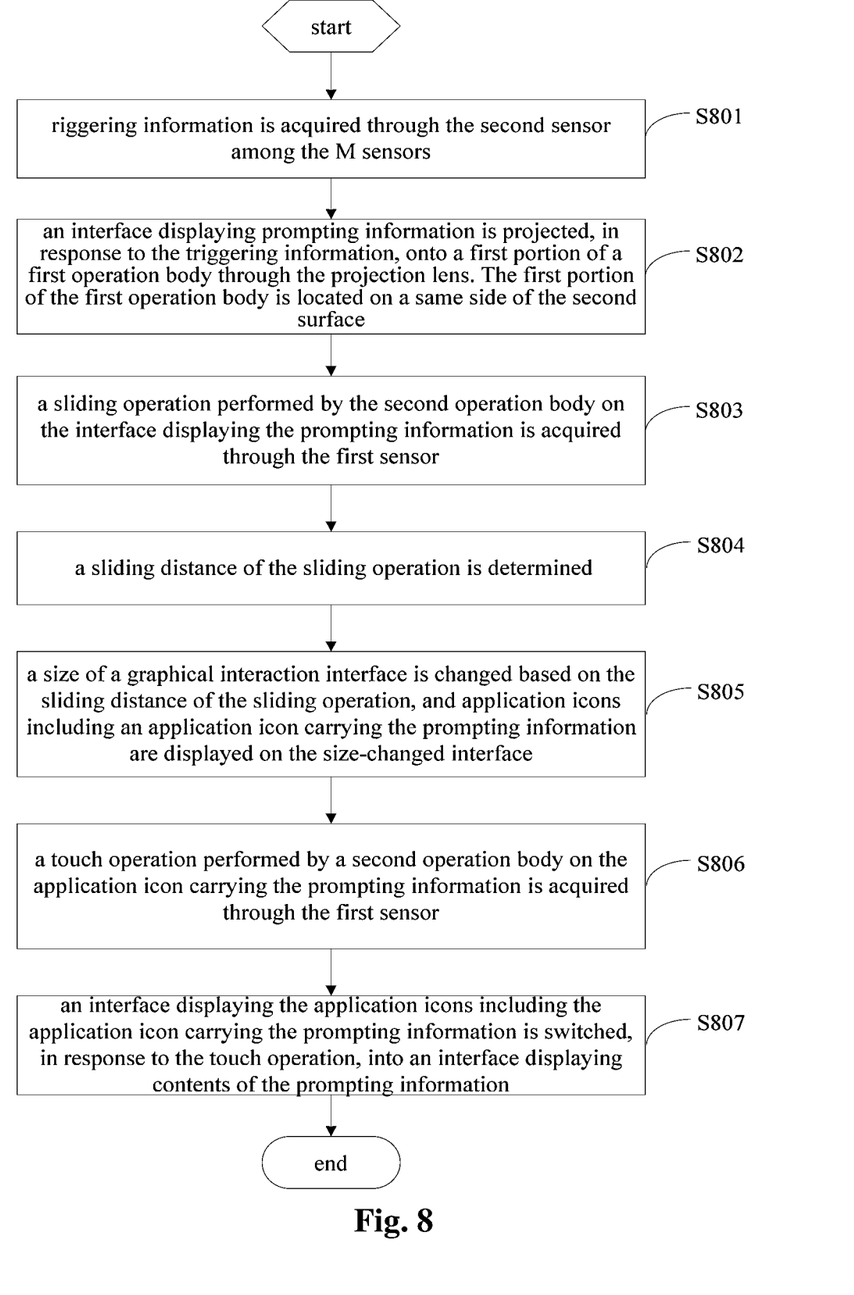
FIG. 8 is a schematic flow chart of a method for processing information according to an embodiment of the disclosure.

FIG. 8 is a schematic flow chart of a method for processing information according to an embodiment of the disclosure. The method is also applied to the electronic device shown in FIG. 2. The method may include the following steps S601-S604.

In the step S801, triggering information is acquired through the second sensor among the M sensors.

In the step S802, an interface displaying prompting information is projected, in response to the triggering information, onto a first portion of a first operation body through the projection lens. The first portion of the first operation body is located on a same side of the second surface.

In the step S803, a sliding operation performed by the second operation body on the interface displaying the prompting information is acquired through the first sensor.

The first sensor may be, but not limited to an image capture device such as a camera.

In the step S804, a sliding distance of the sliding operation is determined.

In the step S805, a size of a graphical interaction interface is changed based on the sliding distance of the sliding operation, and application icons including an application icon carrying the prompting information are displayed on the size-changed interface.

In the step S806, a touch operation performed by a second operation body on the application icon carrying the prompting information is acquired through the first sensor.

In the step S807, an interface displaying the application icons including the application icon carrying the prompting information is switched, in response to the touch operation, into an interface displaying contents of the prompting information.

For example, in the case that the electronic device receives three short messages, prompting information of "three short messages are received" is displayed on the display exposed on the first surface of the frame structure. Assuming that the second sensor is a touch unit arranged on the display, the electronic device acquires the triggering information in the case that the user clicks the displayed prompting information, and the interface displaying the prompting information is projected, in response to the triggering information, onto the first operation body. The interface displaying the prompting information may be a small interface displaying only the prompting information.

In the case that the sliding operation performed by a hand of the user on the interface displaying the prompting information is acquired through the first sensor, the electronic device enlarges, based on the sliding distance of the finger of the user, the interface displaying the prompting information. The contents displayed on the interface are changed. That is, the interface displaying the prompting information is switched into an enlarged interface displaying the application icons. A short message icon is displayed on the enlarged interface displaying the application icons. The short message icon may carry a sign "3" for prompting the user that three short messages are received.

In the case that a touch operation performed by the finger of the user on the short message icon displayed in the interface displaying the application icons is acquired by the first sensor, i.e., in the case that the user clicks the short message icon with his finger, the electronic device switched from a current interface displaying the application icons into an interface displaying contents of the three short messages.

That is, the electronic device displays the contents of the short messages on the arm of the user.

With the method for processing information provided in the disclosure, the graphical interaction interface is projected onto the arm of the user. The user may change, with an interaction operation performed on the graphical interaction interface, the size and the displayed contents of the graphical interaction interface projected onto the arm of the user. The size of the graphical interaction interface projected onto the arm of the user is not limited by sizes of the electronic device and the display, thereby leading to a good user experience.

Corresponding to the forgoing methods for processing information, an electronic device is further provided according to an embodiment of the disclosure. As shown in FIG. 7, the electronic device includes a frame structure, a first display component, a second display component and M sensors. The frame structure includes a fixing structure through which the electronic device is fixable to a first operation body of a first user. The first display component and the second display component are fixed on the frame structure. The first display component includes a display exposed on a first surface of the frame structure, and the second display component includes a projection lens exposed on a second surface of the frame structure. The first surface intersects with the second surface. The M sensors are fixed through the frame structure. The M sensors include a first sensor exposed from the second surface of the frame structure. The electronic device may further include a first acquisition unit 901, a first response unit 902, a second acquisition unit 903 and a second response unit 904.

Figure 9:
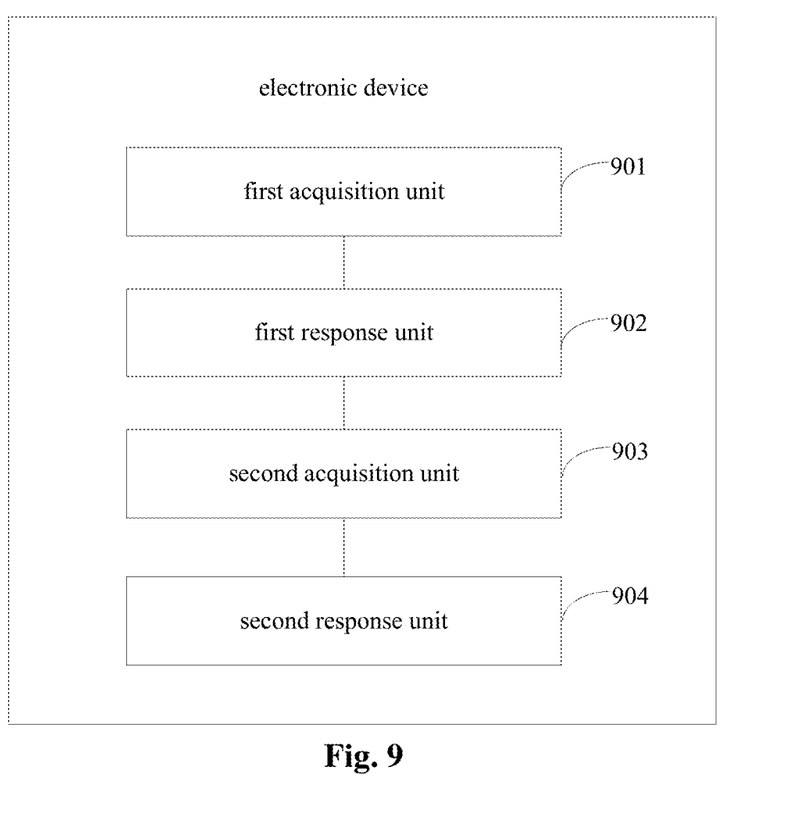
FIG. 9 is a schematic structural diagram of an electronic device according to an embodiment of the disclosure.

The first acquisition unit 901 is for acquiring triggering information through a second sensor among the M sensors.

The first response unit 902 is for projecting, in response to the triggering information acquired by the first acquisition unit 90, a graphical interaction interface onto a first portion of the first operation body through the projection lens. The first portion of the first operation body is located on a same side as the second surface.

The second acquisition unit 903 is for acquiring, through the first sensor, an interaction operation performed by a second operation body on the graphical interaction interface.

The second response unit 904 is for changing the graphical interaction interface in response to the interaction operation acquired by the second acquisition unit 903.

In the electronic device provided in the disclosure, the trigger information may be acquired through the second sensor arranged on the electronic device, the graphical interaction interface may be projected onto the first operation body (an arm of the user) through the projection lens, then the interaction operation performed by a second operation body (a hand of the user) on the graphical interaction interface may be acquired by the first sensor, and the graphical interaction interface may be changed. With the electronic device according to the embodiment of the disclosure, the graphical interaction interface is projected onto the arm of the user, the graphical interaction interface projected onto the arm of the user may be changed in response to the interaction operation performed on the graphical interaction interface. The size of the graphical interaction interface projected onto the arm of the user is not limited by sizes of the electronic device and the display, thereby leading to a good user experience.

In one implementation, the interaction operation acquired by the second acquisition unit 903 may be a sliding operation performed by the second operation body on the graphical interaction interface.

Here, the second response unit 902 may include a first determination subunit and a first control subunit. The first determination subunit is for determining a sliding distance of the sliding operation, and the first control subunit is for changing the size of the graphical interaction interface based on the sliding distance of the sliding operation.

In one implementation, the interaction operation may be a sliding operation performed by the second operation body on a graphical interaction interface, and the graphical interaction interface is an interface displaying prompting information.

Here the second response unit 902 may include a second determination subunit and a second control subunit. The second determination subunit is for determining a sliding distance of the sliding operation, and the second control subunit is for changing the size of the graphical interaction interface based on the sliding distance of the sliding operation and displaying the prompting information on the size-changed graphical interaction interface.

In one implementation, the graphical interaction interface may be an interface displaying application icons, and the interaction operation is a touch operation performed by the second operation body on a first application icon among the application icons displayed in the interface.

Here the second response unit 902 may include an application starting subunit and a third control subunit. The application starting subunit is for starting a first application corresponding to the first application icon, and the third control subunit is for switching the interface displaying the application icons into an interface of the first application.

It should be noted that the electronic device has a standard mode and a smart mode. The electronic device switches from the standard mode to the smart mode in the case that the first acquisition unit 901 acquires the trigger information. In the smart mode, the graphical interaction interface is the interface displaying the application icons.

In one implementation, the interaction operation may be a sliding operation performed by the second operation body on the graphical interaction interface, and the graphical interaction interface is an interface displaying prompting information.

Here the second response unit 902 may include a third determination subunit, a fourth control subunit, an acquisition subunit and a response subunit. The third determination subunit is for determining a sliding distance of the sliding operation; the fourth control subunit is for changing, based on the sliding distance of the sliding operation, a size of the interface displaying the prompting information, and displaying, on the size-changed interface, application icons including an application icon carrying the prompting information; the acquisition subunit is for acquiring, through the first sensor, a touch operation performed by the second operation body on the application icon carrying the prompting information; and the response subunit is for switching, in response to the touch operation, the interface displaying the application icons including the application icon carrying the prompting information into an interface displaying contents of the prompting information.

It should be noted that, in the specification, the embodiments are described progressively. Differences from other embodiments are highlighted in the description of each embodiment, while similar parts among the embodiments may be referred to each other. Device embodiments or system embodiments, similar to method embodiments, are briefly described, and similar parts may be referred to descriptions of the method embodiments.

It should be further noted that, herein, relational terms such as "first" and "second" are only used to distinguish one entity or operation from another entity or operation, rather than to require or imply that there is such actual relationship or order between these entities or operations. Moreover, terms of "comprise", "include" or any other variants thereof are non-exclusive. Accordingly, a process, method, article or device including a series of elements may include not only those elements, but also other elements which are not explicitly listed and inherent elements of the process, method, article or device. In case of no further restrictions, an element limited by a statement "includes a . . . " does not exclude that there may be other similar elements in the process, method, article or device including the element.

Steps of the methods or the algorithms according to the embodiments of the disclosure may be implemented through any one or a combination of a hardware and a software module executed by a processor. The software module may be provided in a Random Access Memory (RAM), a memory, a Read-Only Memory (ROM), an electrically programmable ROM, an electrically erasable programmable ROM, a register, a hardware, a movable disc, a CD-ROM, or any other forms of conventional storage media.

With the above descriptions of the disclosed embodiments, those skilled in the art may implement or use the present disclosure. Various modifications to those embodiments are obvious to those skilled in the art, and ordinal principles defined in the present disclosure may be implemented in other embodiments without departing from the spirit or the scope of the present disclosure. Therefore, the present disclosure is not limited to those embodiments disclosed herein, but claims a widest scope in accordance with the principles and novel characteristics disclosed in the present disclosure.

The invention claimed is:

1. A method for processing information, comprising:
acquiring triggering information by detecting a touch operation performed on an operable object displayed on a display of an electronic device by a touch unit arranged on the display;
in response to the triggering information being acquired, switching from a standard mode in which the electronic device displays information on the display of the electronic device, to a smart mode to project a graphical interaction interface onto a first portion of a user through a projection lens;
acquiring, through a plurality of sensors, a touch interaction operation performed on the graphical interaction interface; and
changing the graphical interaction interface in response to the touch interaction operation;
wherein the touch interaction operation comprises a sliding operation performed on the graphical interaction interface, the graphical interaction interface comprises an interface displaying prompting information; and
the changing of the graphical interaction interface in response to the touch interaction operation comprises:
determining a sliding distance of the sliding operation; and
changing a size of the graphical interaction interface based on the sliding distance of the sliding operation and displaying contents of the prompting information on the size-changed graphical interaction interface.

2. The method according to claim 1, further comprising:
displaying an application icon, wherein the touch interaction operation comprises a touch operation performed on the application icon; and
the changing the graphical interaction interface in response to the touch interaction operation comprises:
starting a first application corresponding to the application icon and switching an interface displaying the application icon into an interface of a first application.

3. The method according to claim 1, wherein
the changing the graphical interaction interface in response to the touch interaction operation further comprises:
displaying, on the size-changed interface, application icons comprising an application icon carrying the prompting information;
acquiring, through one of the plurality of sensors a touch operation on the application icon carrying the prompting information; and
switching, in response to the touch operation, the interface displaying the application icons comprising the application icon carrying the prompting information into an interface displaying contents of the prompting information.

4. An electronic device, comprising:
a housing;
a first display component;
a second display component; and
a plurality of sensors,
wherein the housing comprises a fixing structure through which the electronic device is fixable to a user, the first display component and the second display component are fixed on the housing, the first display component comprises a display exposed on a first surface of the housing, the second display component comprises a projection lens exposed on a second surface of the housing, the first surface intersects with the second surface, the plurality of sensors fixed through the housing body, the plurality of sensors comprises a first sensor exposed from the second surface of the housing;
wherein the electronic device further comprises a processor which is configured to:
acquire triggering information by detecting a touch operation performed on an operable object displayed on the display of an electronic device by a touch unit arranged on the display of the plurality of sensors;
project, in response to the triggering information, a graphical interaction interface through the projection lens;
acquire, through the first sensor, a touch interaction operation on the graphical interaction interface; and
change the graphical interaction interface in response to the touch interaction operation,
wherein, the electronic device has a standard mode in which the electronic device displays information on the display of the electronic device, and a smart mode in which the graphical interaction interface is projected through the projection lens, and switches from the standard mode to the smart mode,
wherein the graphical interaction interface is an interface displaying prompting information, the touch interaction operation comprises a sliding operation on the graphical interaction interface and
the processor is further configured to:
determine a sliding distance of the sliding operation; and
change a size of the graphical interaction interface based on the sliding distance of the sliding operation and display the prompting information on the size-changed graphical interaction interface.

5. The electronic device according to claim 4, wherein the graphical interaction interface is an interface displaying application icons, the touch interaction operation comprises a touch operation performed by the second operation body on a first application icon among the application icons displayed in the graphical interaction interface, and the processor is further configured to:

start a first application corresponding to the first application icon; and     switch the interface displaying the application icons into an interface of the first application.

6. The electronic device according to claim 4, wherein the processor is further configured to:

display application icons comprising an application icon carrying the prompting information on the size-changed interface;

acquire, through the first sensor, a touch operation performed on the application icon carrying the prompting information; and     switch, in response to the touch operation, the interface displaying the application icons comprising the application icon carrying the prompting information into an interface displaying contents of the prompting information.

\* \* \* \* \*